(12) United States Patent
Liu

(10) Patent No.: US 11,129,060 B2
(45) Date of Patent: Sep. 21, 2021

(54) HANDOVER METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/930,180

(22) Filed: Jul. 15, 2020

(65) Prior Publication Data

US 2020/0351721 A1    Nov. 5, 2020

Related U.S. Application Data

(63) Continuation of application No. PCT/CN2018/072908, filed on Jan. 16, 2018.

(51) Int. Cl.
*H04W 36/00* (2009.01)
*H04W 36/08* (2009.01)
(Continued)

(52) U.S. Cl.
CPC ....... *H04W 36/0022* (2013.01); *H04W 36/00* (2013.01); *H04W 36/0011* (2013.01);
(Continued)

(58) Field of Classification Search
CPC . H04W 36/0022; H04W 36/08; H04W 36/38; H04W 36/14; H04W 36/30; H04W 36/00; H04W 36/0011; H04W 36/02
(Continued)

(56) References Cited

U.S. PATENT DOCUMENTS 9,380,510 B2    6/2016 Kim
2007/0064686 A1*  3/2007 Bae ................... H04W 36/0011
370/356
(Continued)

FOREIGN PATENT DOCUMENTS

CN    107302777 A    10/2017
WO    2009021214 A2   2/2009
WO    2014082269 A1   6/2014

OTHER PUBLICATIONS

OPPO. "Clarification on eNB Id is Unchanged during HO", SA WG2 Meeting #124 S2-178437 Nov. 27-Dec. 1, 2017, Reno, Nevada, USA, Dec. 1, 2017 (Dec. 1, 2017), pp. 1-6, section 4.11.1.2, and figure 4.11.1.2.1-1.

(Continued)

*Primary Examiner* — Michael Y Mapa
(74) *Attorney, Agent, or Firm* — Ladas & Parry, LLP

(57) ABSTRACT

A handover method and apparatus, and a computer storage medium are provided. The method comprises: a first access network element sending a first handover request message to a second access network element so as to trigger the handover of a terminal from a first access network to a second access network, and keeping a connection between the first access network and a first core network unchanged, wherein data of the terminal is forwarded by the second access network and is transmitted between the first access network and the first core network; and the first access network element sending a second handover request message to a first core network element to trigger the handover from the first core network to a second core network, wherein the data of the terminal is transmitted between the second access network and the second core network.

18 Claims, 6 Drawing Sheets

---

A first access network sends a first handover request to a second access network element to trigger handover of UE from a first access network to a second access network with a connection between the first access network and a first core network kept unchanged, data of the UE being forwarded by the second access network for transmission between the first access network and the first core network — 501

The first access network element sends a second handover request to a first core network element to trigger handover from the first core network to a second core network, the data of the UE being transmitted between the second access network and the second core network — 502

(51) Int. Cl.
*H04W 36/38* (2009.01)
*H04W 36/14* (2009.01)
*H04W 36/30* (2009.01)
*H04W 36/02* (2009.01)

(52) U.S. Cl.
CPC .......... *H04W 36/02* (2013.01); *H04W 36/08* (2013.01); *H04W 36/14* (2013.01); *H04W 36/30* (2013.01); *H04W 36/38* (2013.01)

(58) Field of Classification Search
USPC .................................. 370/331; 455/436–445
See application file for complete search history.

(56) References Cited

U.S. PATENT DOCUMENTS

| | | | |
|---|---|---|---|
| 2009/0124259 A1* | 5/2009 | Attar | ............. H04L 47/34 455/436 |
| 2010/0189076 A1 | 7/2010 | Kim | |
| 2011/0149905 A1 | 6/2011 | Kim | |

OTHER PUBLICATIONS

International Search Report in the international application No. PCT/CN2018/072908, dated Sep. 27, 2018.
Written Opinion of the International Searching Authority in the international application No. PCT/CN2018/072908, dated Sep. 27, 2018 with English translation provided by Google Translate.
"3rd Generation Partnership Project; Technical Specification Group Services and System Aspects; Procedures for the 5G System; Stage 2 (Release 15)",3GPP Standard; Technical Specification; 3GPP TS 23.502, 3rd Generation Partnership Project (3GPP), Mobile Competence Centre; 650, Route Des Lucioles; F-06921, Sophia-Antipolis Cedex; France, vol. SA WG2, No. V15.0.0, Dec. 22, 2017 (Dec. 12, 2017), pp. 1-258, XP051392102, * p. 107-p. 124; figures4. 11.1.2.1-1,4.91.3.2-1*.
China Mobile et al: "Proposals for RRC connection release with redirection for Connected Mobility for IWK" 3GPP Draft; S2-178371 Proposals for Proposals for RRC Connection Release With Redirection for Connected Mobility for IWK-R2. 3rd Generation Partnership PROJEC(3GPP), Mobile Competence Centre; 650, vol. SA WG2, No. Reno, USA; Nov. 27, 2017-Dec. 1, 2017, Nov. 21, 2017 (Nov. 21, 2017), XP051367046, [ retrieved on Nov. 21, 2017].
Supplementary European Search Report in the European application No. 18901437.6, dated Oct. 21, 2020.
English translation of the Written Opinion of the International Search Authority in the international application No. PCT/CN2018/072908, dated Sep. 27, 2018.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)" 3GPP TS 36.300 V13.2.0 (Dec. 2015), http://www.3gpp.org.
"3rd Generation Partnership Project;Technical Specification Group Services and System Aspects; System Architecture for the 5G System; Stage 2 (Release 15)" 3GPP TS 23.501 V1.0.0 (Jun. 2017), http://www.3gpp.org.
SA WG2 "Presentation of TR 23.501: System Architecture for the 5G System (Release 15) to TSG SA for Approval" 3GPP TSG SA Meeting #76 TD SP-170384, Jun. 7-9, 2017, West Palm Beach, Florida, USA.
First Office Action of the European application No. 18901437.6, dated Jun. 11, 2021.

* cited by examiner

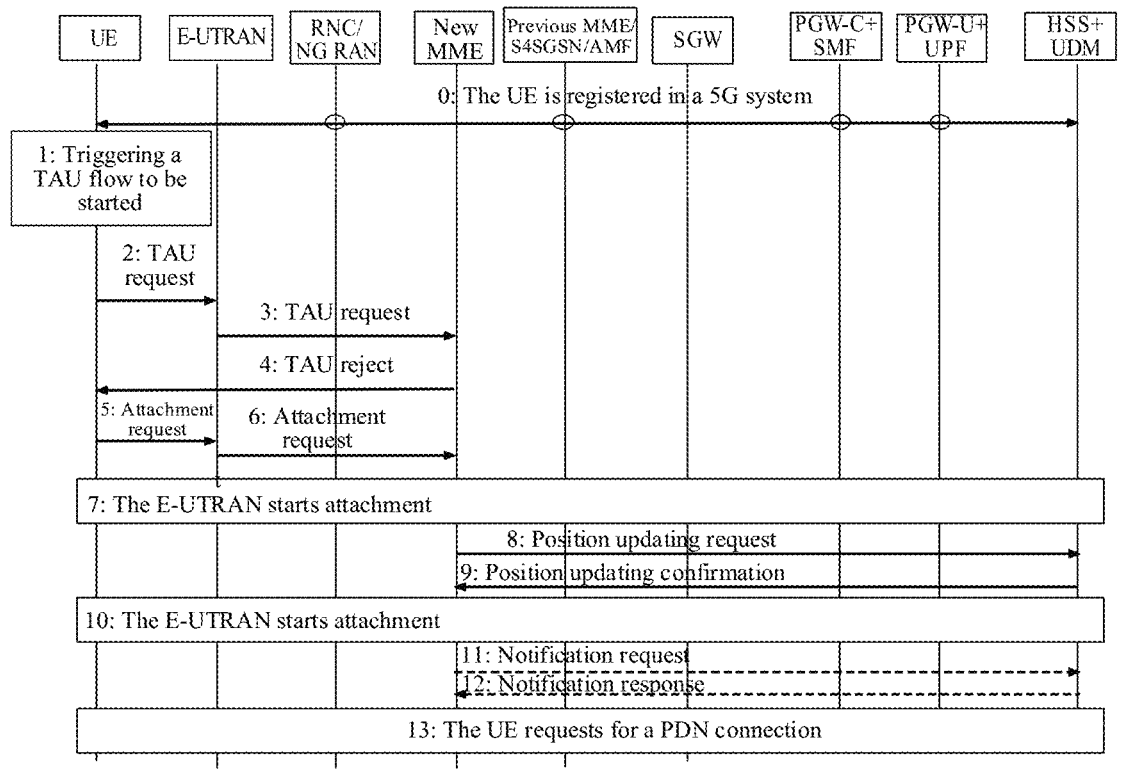

FIG. 4

A first access network sends a first handover request to a second access network element to trigger handover of UE from a first access network to a second access network with a connection between the first access network and a first core network kept unchanged, data of the UE being forwarded by the second access network for transmission between the first access network and the first core network — 501

The first access network element sends a second handover request to a first core network element to trigger handover from the first core network to a second core network, the data of the UE being transmitted between the second access network and the second core network — 502

FIG. 5

601 — After UE is handed over from a first access network to a second access network with a connection between the first access network and a first core network kept unchanged, a first core network element receives a second handover request sent by a first access network element, the second handover request being configured to trigger handover from the first core network to a second core network and data of the UE being transmitted between the second access network and the second core network after handover from the first core network to the second core network

FIG. 6

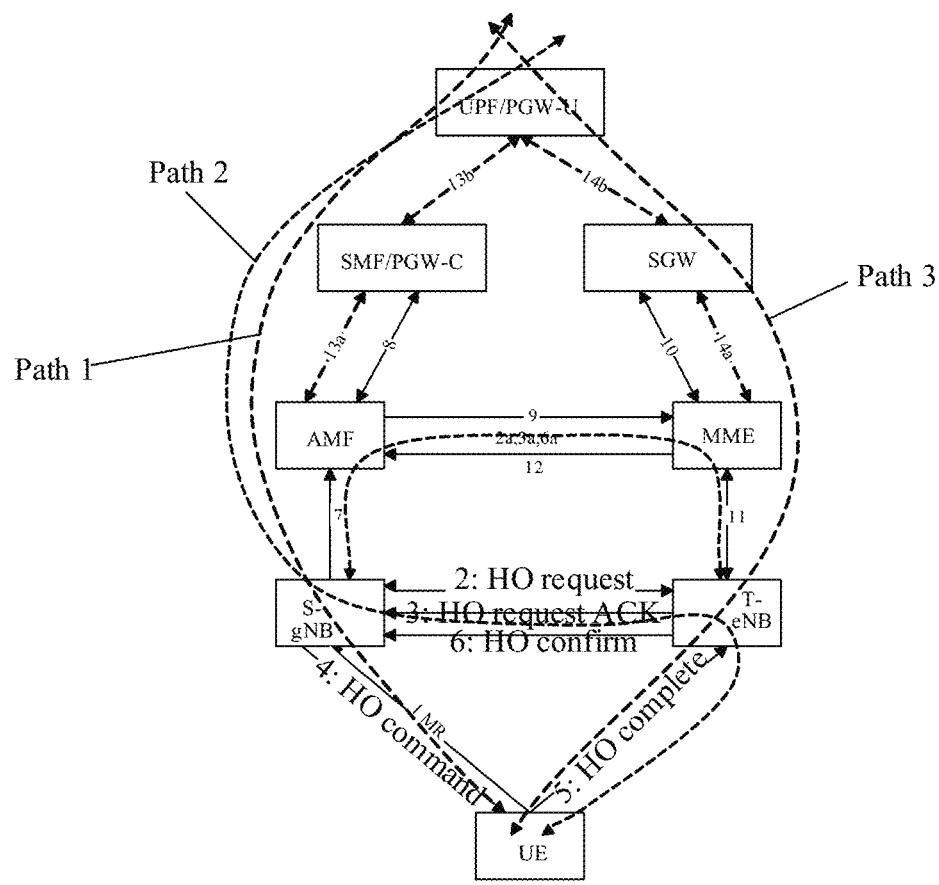

FIG. 7

HANDOVER METHOD AND APPARATUS, AND COMPUTER STORAGE MEDIUM

CROSS REFERENCE TO RELATED APPLICATION

This application is a continuation of International Patent Application No. PCT/CN2018/072908 filed on Jan. 16, 2018, the disclosure of which is hereby incorporated by reference in its entirety.

BACKGROUND

In a Next Generation (NG) system, there may be such a scenario for a Radio Access Network (RAN) that a gNB and an Evolved Node B (eNB) simultaneously access or respectively access a 5th-Generation (5G) Core Network (CN) as shown in FIG. 1. For the gNB (for example, a 5G RAN in FIG. 1), if a target Identifier (id) in a Handover Require (HO Require) message sent to a Core Access and Mobility Management Function (AMF) is an eNB id and the eNB accesses both the 5G CN and an Evolved Packet Core (EPC), the AMF at present cannot determine whether to perform Radio Access Technology (RAT) handover (namely the 5G CN does not change and a base station changes from the gNB to the eNB) or System handover (namely a core network changes from the 5G CN to the EPC).

In addition, if system handover is required, it is necessary to execute a handover flow of handover from the 5G CN to the EPC, and similarly, in case of handover from the EPC to the 5G CN, it is also necessary to execute a corresponding handover flow. In an existing cross-system (namely cross-CN) handover process, there are too many steps for preparation of target network links and resource, and if a terminal moves too fast, a handover command may be transmitted too late, resulting in a handover failure. The operation flow for handover of the core network is relatively high in time consumption, which may bring the disadvantages such as interruption, relatively long delay or the like to a service.

SUMMARY

The disclosure relates to the technical field of wireless communication. For solving the technical problem, embodiments of the disclosure provide a handover method and device and a computer storage medium.

The embodiments of the disclosure provide a handover method, which may include the following operations.

A first RAN element sends a first handover request message to a second RAN element to trigger handover of UE from a first RAN to a second RAN with a connection between the first RAN and a first core network kept unchanged, where data of the UE is forwarded by the second RAN for transmission between the first RAN and the first core network.

The first RAN element sends a second handover request message to a first core network element to trigger handover from the first core network to a second core network, where the data of the UE is transmitted between the second RAN and the second core network.

The embodiments of the disclosure provide a handover method, which may include the following operation.

After UE is handed over from a first RAN to a second RAN with a connection between the first RAN and a first core network kept unchanged, a first core network element receives a second handover request message from a first RAN element, where the second handover request is used to trigger handover from the first core network to a second core network and data of the UE is transmitted between the second RAN and the second core network after handover from the first core network to the second core network.

The embodiments of the disclosure provide a handover device, which may include a first sending unit and a second sending unit.

The first sending unit may be configured to send a first handover request message to a second RAN element to trigger handover of UE from a first RAN to a second RAN with a connection between the first RAN and a first core network kept unchanged, where data of the UE is forwarded by the second RAN for transmission between the first RAN and the first core network.

The second sending unit may be configured to send a second handover request message to a first core network element to trigger handover from the first core network to a second core network, the data of the UE being transmitted between the second RAN and the second core network.

The embodiments of the disclosure provide a handover device, which may include a first receiving unit.

The first receiving unit may be configured to, after UE is handed over from a first RAN to a second RAN with a connection between the first RAN and a first core network kept unchanged, receive a second handover request message sent by a first RAN element, where the second handover request is used to trigger handover from the first core network to a second core network and data of the UE is transmitted between the second RAN and the second core network after handover from the first core network to the second core network.

The embodiments of the disclosure provide a computer storage medium, having stored therein computer-executable instructions, where the computer-executable instructions, when being executed by a processor, enable the processor to implement the abovementioned handover method.

In the technical solutions of the embodiments of the disclosure, the first RAN element sends the first handover request message to the second RAN element to trigger handover of UE from the first RAN to the second RAN with the connection between the first RAN and the first core network kept unchanged, where the data of the UE is forwarded by the second RAN for transmission between the first RAN and the first core network; and the first RAN element sends the second handover request message to the first core network element to trigger handover from the first core network to the second core network, where the data of the UE is transmitted between the second RAN and the second core network. With adoption of the technical solutions of the embodiments of the disclosure, RAN handover is performed at first and then core network handover is performed. In such a stepwise handover manner, reliability of handover is improved, a service delay is reduced, and a user experience is improved.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings:

FIG. 4 is a flowchart of handover between an EPC and a 5G CN without an N26 interface.

FIG. 5 is a first schematic flowchart of a handover method according to an embodiment of the disclosure.

FIG. 6 is a second schematic flowchart of a handover method according to an embodiment of the disclosure.

FIG. 7 is a third schematic flowchart of a handover method according to an embodiment of the disclosure.

DETAILED DESCRIPTION

For making the technical solutions of the embodiments of the disclosure convenient to understand, related technologies involved in the embodiments of the disclosure will be described below.

A handover procedure will be described below in combination with whether there is an N26 interface between an EPC and a 5G CN.

In the first condition, there is an N26 interface between the EPC and the 5G CN.

Figure 1:
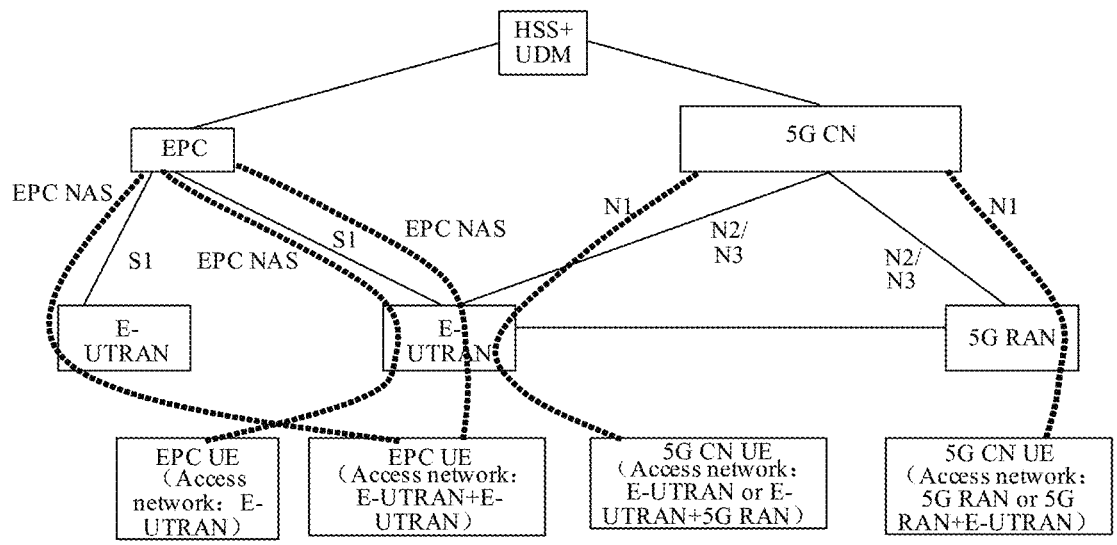
FIG. 1 is a connection architecture diagram of an RAN and a core network in NG.
Figure 2:
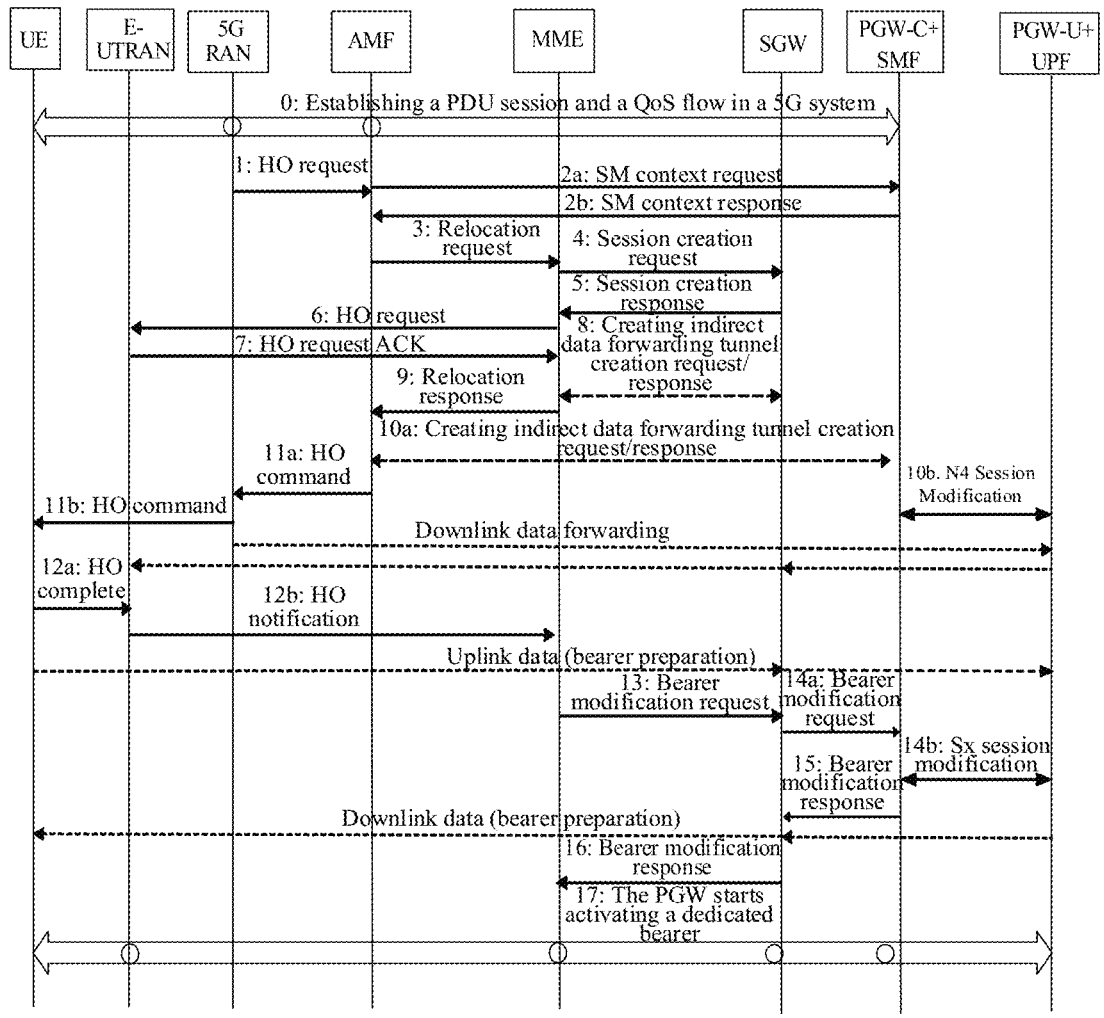
FIG. 2 is a flowchart of System handover (namely a core network changes from a 5G CN to an EPC) in a connected-state scenario.
Figure 3:
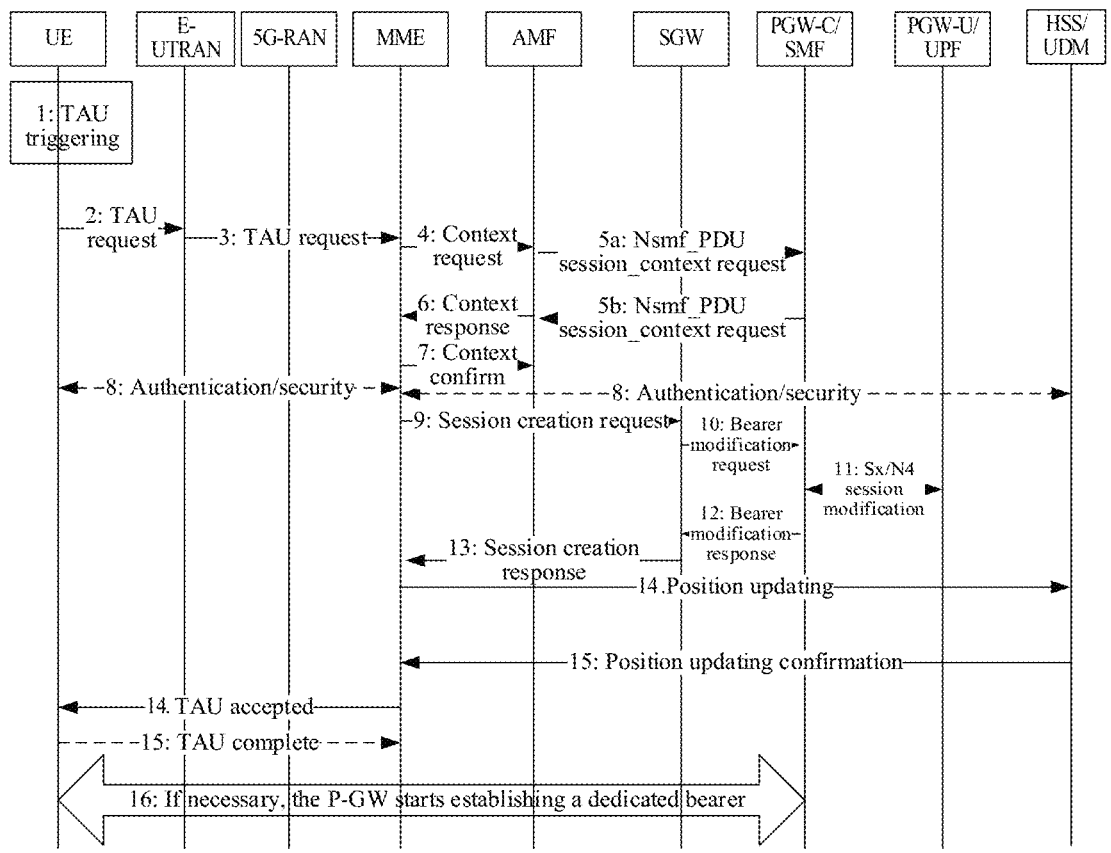
FIG. 3 is a flowchart of System handover (namely a core network changes from a 5G CN to an EPC) in an idle-state scenario.

FIG. 2 is a flowchart of System handover (namely a core network changes from a 5G CN to an EPC) in a connected-state scenario. FIG. 3 is a flowchart of system handover (namely a core network changes from a 5G CN to an EPC) in an idle-state scenario. Various network elements involved in FIG. 2 and FIG. 3 are explained as follows.

UE refers to User Equipment.

E-UTRAN refers to Evolved Universal Terrestrial Radio Access Network.

5G-RAN refers to 5G Radio Access Network.

AMF refers to Core Access and Mobility Management Function.

MME refers to Mobility Management Entity.

SGW refers to Serving Gateway.

PGW-C refers to Packet Data Network GateWay-Control plane.

SMF refers to Session Management (SM) Function.

PGW-U refers to Packet Data Network GateWay-User plane.

UPF refers to User Plane Function.

As shown in FIG. 2, if the UE is in a connected state, the 5G-RAN determines an opportunity for triggering handover according to a measurement threshold. The 5G-RAN, responsive to determining to trigger handover, may send a handover request command to the AMF of a 5G CN (i.e., Step 1), where a 5G CN side and a 4G CN side may prepare a resource; and then the 5G-RAN sends a handover command to the UE (i.e., Step 11b), so that the UE is handed over to operate on a 4G network.

As shown in FIG. 3, if the UE is in an idle state, the UE sends a Tracking Area Update (TAU) Request to the MME in the 4G CN, and the MME is responsible for obtaining related context information from the 5G CN and completing a position updating flow in the 4G CN.

In the second condition, there is no N26 interface between the EPC and the 5G CN.

FIG. 4 is a flowchart of handover between an EPC and a 5G CN without N26 interface.

At present, under the condition of cross-system handover of the 5G CN and the EPC, if there is no N26 interface between the EPC and the 5G CN, two behaviors of the UE are specified.

Firstly, as shown in FIG. 4, if the UE may recognize an indication of "supporting N26-free handover" sent by a network side, the UE may execute Attach with Handover flag, and carry an Access Point Name (APN)/Data Network Name (DNN) corresponding to a Protocol Data Unit (PDU) session in a 5G system (Step 5 in FIG. 4). An attach request message may be used to trigger the network side to search for corresponding jointed network elements SMF+PGW-C, UPF+PGW-U and PCF+PCRF according to the APN/DNN used by the UE, to enable the jointed network elements to map out a 4G Session Management (SM) context, so as to achieve consistency of an Internet Protocol (IP) address of the session.

Secondly, as shown in FIG. 4, if the UE does not recognize the indication of "supporting N26-free handover" sent by the network side, a TAU request is directly sent (Step 1 and Step 2 in FIG. 4). In such case, if the network side does not support the N26 interface, the network side may send a TAU reject message to the UE, and then the UE may initiate an ordinary attach flow. Under this condition, consistency of the IP address of the session may not be ensured.

The embodiments of the disclosure disclose a handover method. When a terminal moves from coverage of a first CN element to coverage of a second core network element, handover is executed in two steps. The first step is that the UE is handed over from a source RAN to a target RAN. The second step is that the UE is handed over from a source core network to a target core network.

In the following technical solutions of the embodiments of the disclosure, a first RAN refers to the source RAN, a second RAN refers to the target RAN, a first CN refers to the source core network, and a second CN refers to the target core network. In the following embodiments, for example, the source RAN and the source core network each is a 5G system, and the target RAN and the target core network each is a 4G system. It is to be understood that the source RAN and the source core network are not limited to the 5G system and the target RAN and the target core network are also not limited to the 4G system.

In the first RAN, a first RAN element refers to a source RAN element.

In the second RAN, a second RAN element refers to a target RAN element.

In the first CN, a first CN element refers to an AMF, a third CN element refers to SMF+PGW-C (i.e., SMF/PGW-C), and a fifth CN element refers to UPF+PGW-U (i.e., UPF/PGW-U).

In the second CN, a second CN element refers to an MME, a fourth CN element refers to an SGW, and a sixth CN element refers to UPF+PGW-U (i.e., UPF/PGW-U).

FIG. 5 is a first flowchart of a handover method according to an embodiment of the disclosure. As shown in FIG. 5, the handover method includes the following steps.

In 501, a first RAN element sends a first handover request message to a second RAN element to trigger handover of UE from a first RAN to a second RAN with a connection between the first RAN and a first CN kept unchanged, where data of the UE is forwarded by the second RAN for transmission between the first RAN and the first CN.

Before the operation of 501, the first RAN element receives a Measurement Report (MR) sent by the UE and determines, based on the MR that core network handover is required.

In the embodiment of the disclosure, for ensuring a delay requirement of a service, core network handover is executed in the following two steps. The first step is RAN handover, namely when the UE is handed over from the first RAN to the second RAN, the connection between the first RAN and the first CN is kept unchanged.

Specifically, the handover of UE from the first RAN to the second RAN is implemented as follows.

Firstly, the first RAN element sends the first handover request message to the second RAN element.

Secondly, the first RAN element receives a handover request ACK message sent by the second RAN element.

Thirdly, the first RAN element sends a handover command to the UE such that the UE sends a handover completion message to the second RAN element.

Fourth, the first RAN element receives handover ACK message sent by the second RAN element to complete handover of the UE from the first RAN to the second RAN.

In the embodiment of the disclosure, the first handover request message, the handover request ACK message and handover ACK message are transmitted through one of the following manners.

The above messages are transmitted through a direct interface between the first RAN element and the second RAN element; or, the above messages are forwarded by a first CN element and second CN element between the first RAN element and the second RAN element.

In an implementation mode, the handover request ACK message carries a resource allocated to the UE by the second RAN.

In the embodiment of the disclosure, that the data of the UE is forwarded by the second RAN for transmission between the first RAN and the first CN includes the following conditions.

During uplink transmission, uplink data of the UE, after being sent to the second RAN, is forwarded to the first RAN by the second RAN and transmitted between the first RAN and the first CN.

During downlink transmission, downlink data of the UE, after being sent to the first RAN by the first CN, is sent to the second RAN by the first RAN and forward to the UE by the second RAN.

In 502, the first RAN element sends a second handover request message to a first CN element to trigger handover from the first CN to a second CN, the data of the UE being transmitted between the second RAN and the second CN.

In the embodiment of the disclosure, the procedure of handover from the first CN to the second CN is as follows.

Firstly, after the second handover request message sent by the first RAN element is received, the first CN element sends a second indication message to a third CN element, the second indication message being configured to instruct to perform modification of session management context.

Secondly, the first CN element sends a third handover request message to a second CN element to trigger the second CN element to establish a target link in the second CN.

Herein, the operation that the second CN element establishes the target link in the second CN includes the following operations.

The second CN element establishes a link channel with a fourth CN element.

The second CN element establishes a link channel with a second RAN element.

Thirdly, the first CN element receives a target link establishment completion message sent by the second CN element and notifies a fifth CN element to perform user-plane path handover; and/or, the second CN element notifies a sixth CN element to perform user-plane path handover.

In the embodiment of the disclosure, the data of the UE being transmitted between the second RAN and the second CN may include the following conditions.

During uplink transmission, uplink data of the UE, after being sent to the second RAN, is sent to the second CN by the second RAN.

During downlink transmission, downlink data of the UE, after being sent to the second RAN by the second CN, is sent to the UE by the second RAN.

FIG. 6 is a second flowchart of a handover method according to an embodiment of the disclosure. As shown in FIG. 6, the HO method includes the following step.

In 601, after UE is handed over from a first RAN to a second RAN with a connection between the first RAN and a first CN kept unchanged, a first CN element receives a second handover request message sent by a first RAN element, where the second handover request is used to trigger handover from the first CN to a second CN and data of the UE is transmitted between the second RAN and the second CN after handover from the first CN to the second CN.

In an implementation mode, the second handover request message carries a first indication message, the first indication message being used to indicate that the UE completes handover from the first RAN to the second RAN.

In the embodiment of the disclosure, a procedure of handover from the first CN to the second CN is as follows.

Firstly, after the second handover request message sent by the first RAN element is received, the first CN element sends a second indication message to a third CN element, the second indication message being used to instruct to perform modification of session management context.

Secondly, the first CN element sends a third handover request to a second CN element to trigger the second CN element to establish a target link in the second CN.

Herein, the operation that the second CN element establishes the target link in the second CN includes the following operations.

The second CN element establishes a link channel with a fourth CN element.

The second CN element establishes a link channel with a second RAN element.

Thirdly, the first CN element receives a target link establishment completion message sent by the second CN element and notifies a fifth CN element to perform user-plane path handover; and/or, the second CN element notifies a sixth CN element to perform user-plane path handover.

In the embodiment of the disclosure, the data of the UE being transmitted between the second RAN and the second CN may include the following conditions.

During uplink transmission, uplink data of the UE, after being sent to the second RAN, is sent to the second CN by the second RAN.

During downlink transmission, downlink data of the UE, after being sent to the second RAN by the second CN, is sent to the UE by the second RAN.

The technical solution of the embodiment of the disclosure will further be described below in combination with a specific application example.

FIG. 7 is a third flowchart of a handover method according to an embodiment of the disclosure. As shown in FIG. 7, the handover method includes the following steps.

In step 1, UE measures a neighbor cell, and reports an measurement report (MR) to an S-gNB when an measurement reporting condition preset by a network is met.

Herein, the S-gNB is a source RAN element of the UE.

The S-gNB, after receiving the MR sent by the UE, determines, according to the MR, that System handover is required to be performed.

In step 2, the S-gNB sends a HO request to a T-eNB.

Herein, the T-eNB is a target RAN element of the UE.

In step 3, the T-eNB sends a HO request ACK to the S-gNB, where HO request ACK carries a resource allocated to the UE by the T-eNB.

In step 4, the S-gNB transmits a HO command to the UE.

In step 5, the UE sends HO complete to the T-eNB.

In step 6, the T-eNB, after receiving the HO complete sent by the UE, sends HO confirm to the S-gNB.

In the abovementioned steps, if there is no direct interface between the S-gNB and the T-eNB, the messages in steps 2, 3 and 6 may be forwarded by an AMF and an MME.

In step 7, the S-gNB, after receiving the HO complete sent by the T-eNB, sends a core network link handover request to the AMF. In an implementation mode, the core network link handover request may carry an indication message for indicating that radio handover has been completed.

The S-gNB may deliver to the T-eNB user-plane data sent to the UE starting from step 7, and the T-eNB sends the data to the UE. The T-eNB forwards the received data of the UE to the S-gNB, and the S-gNB sends the data of the UE to the AMF (through the path 2 in FIG. 7).

In step 8, the AMF sends a modification instruction for session management context to an SMF/PGW-C to require to modify the session context.

In step 9, the AMF sends a HO request to the MME to request the MME to establish a target link.

In step 10, the MME establishes a link channel with an SGW.

In step 11, the MME establishes a link channel with the T-eNB.

In step 12, the MME notifies the AMF that establishment of the target link channel is completed.

In steps 13a+13b or steps 14a+14b, the AMF or the MME notifies a UPF/PGW-U through the SMF/PGW-C or the SGW to perform user-plane path handover. After these steps, data of the UE and a network is transmitted through the target network link (i.e., path 3 in FIG. 7).

Figure 8:
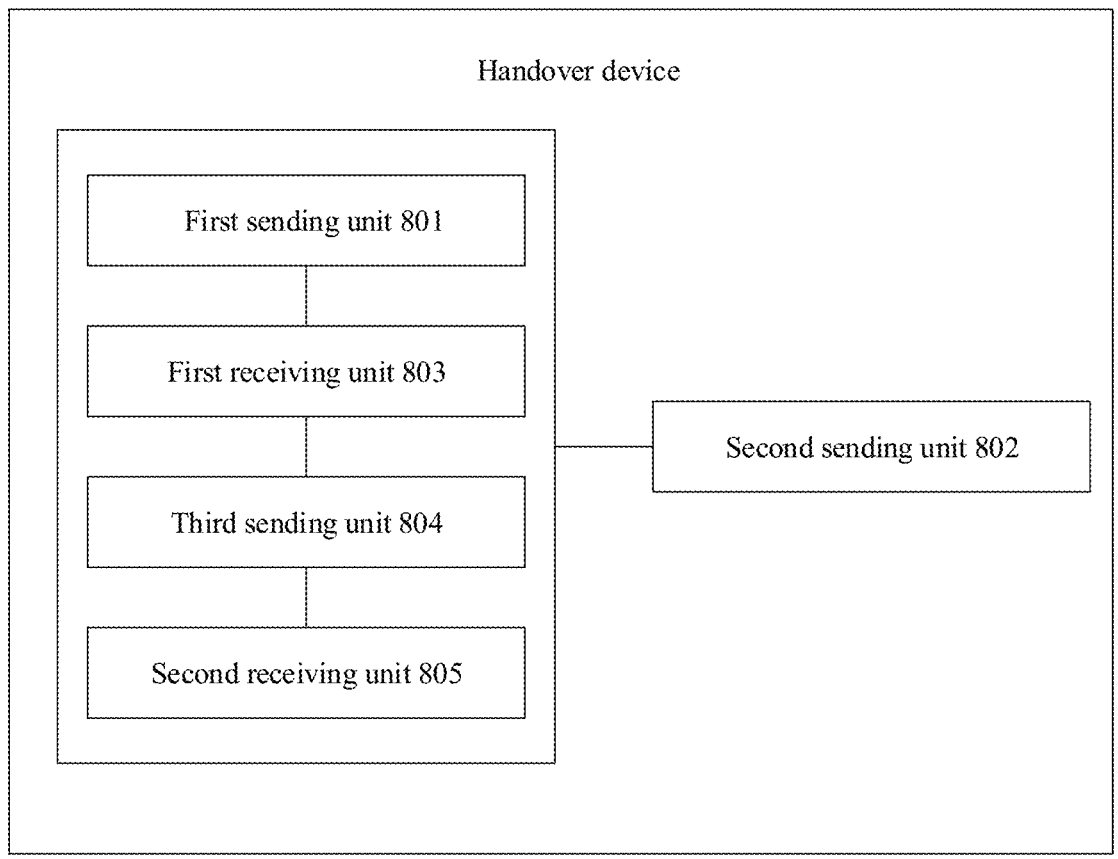
FIG. 8 is a first schematic structural composition diagram of a handover device according to an embodiment of the disclosure.

FIG. 8 is a first schematic structural composition diagram of a handover device according to an embodiment of the disclosure. As shown in FIG. 8, the handover device includes a first sending unit 801 and a second sending unit 802.

The first sending unit 801 is configured to send a first handover request message to a second RAN element to trigger handover of UE from a first RAN to a second RAN with a connection between the first RAN and a first CN kept unchanged, where data of the UE is forwarded by the second RAN for transmission between the first RAN and the first CN.

The second sending unit 802 is configured to send a second handover request message to a first CN element to trigger handover from the first CN to a second CN, where the data of the UE is transmitted between the second RAN and the second CN.

In an implementation mode, the device further includes a first receiving unit 803, a third sending unit 804 and a second receiving unit 805.

The first receiving unit 803 is configured to receive a handover request ACK message sent by the second RAN element.

The third sending unit 804 is configured to send a HO command to the UE such that the UE sends HO complete message to the second RAN element.

The second receiving unit 805 is configured to receive HO confirm sent by the second RAN element to complete handover of the UE from the first RAN to the second RAN.

In an implementation mode, the first HO request, the HO request ACK and the HO confirm are transmitted through one of the following manners.

The messages are transmitted through a direct interface between a first RAN element and the second RAN element; or, the messages are forwarded by the first CN element and second CN element between the first RAN element and the second RAN element.

In an implementation mode, the HO request ACK carries a resource allocated to the UE by the second RAN.

In an implementation mode, the data of the UE being forwarded by the second RAN for transmission between the first RAN and the first CN includes the following conditions.

Uplink data of the UE, after being sent to the second RAN, is forwarded to the first RAN by the second RAN and transmitted between the first RAN and the first CN.

Downlink data of the UE, after being sent to the first RAN by the first CN, is sent to the second RAN by the first RAN and forward to the UE by the second RAN.

Those skilled in the art should know that functions realized by various units in the handover device shown in FIG. 8 may be understood with reference to related descriptions about the handover method. The functions of various units in the handover device shown in FIG. 8 may be realized through programs running in a processor, and may also be realized through a specific logical circuit.

Figure 9:
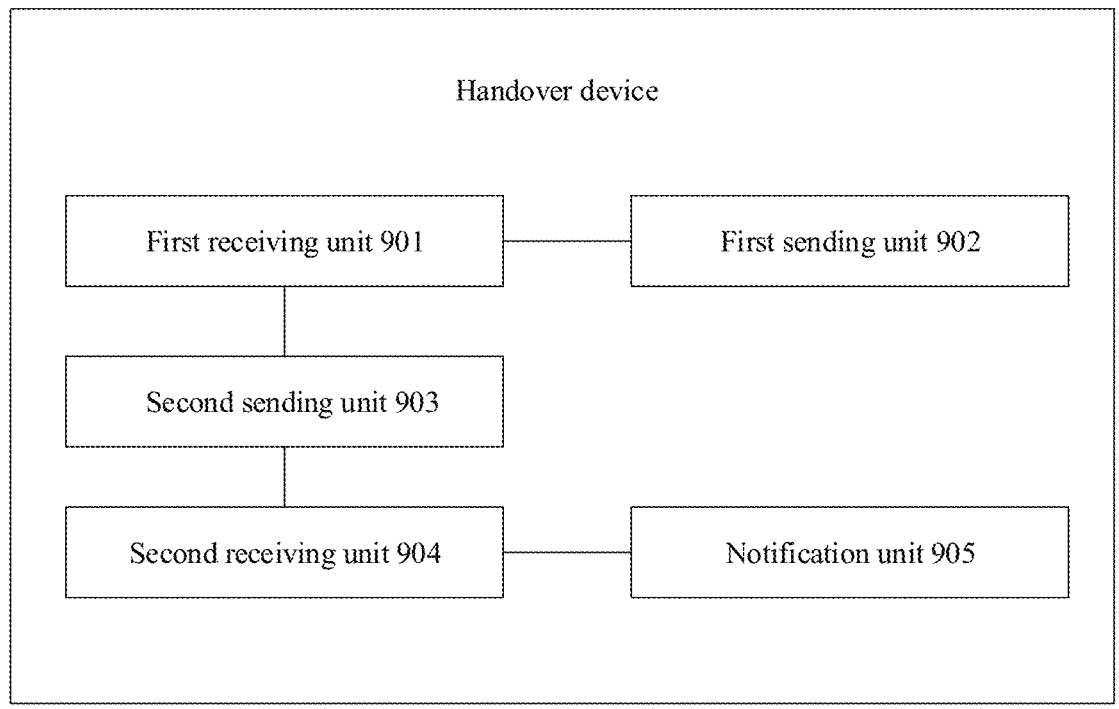
FIG. 9 is a second schematic structural composition diagram of a handover device according to an embodiment of the disclosure.

FIG. 9 is a second schematic structural composition diagram of a handover device according to an embodiment of the disclosure. As shown in FIG. 9, the handover device includes a first receiving unit 901.

The first receiving unit 901 is configured to, after UE is handed over from a first RAN to a second RAN with a connection between the first RAN and a first CN kept unchanged, receive a second HO request sent by a first RAN element, where the second HO request is used to trigger handover from the first CN to a second CN and data of the UE is transmitted between the second RAN and the second CN after the UE is handed over from the first CN to the second CN.

In an implementation mode, the second HO request carries a first indication message, the first indication message being used to indicate that the UE completes handover from the first RAN to the second RAN.

In an implementation mode, the device further includes a first sending unit 902 and a second sending unit 903.

The first sending unit 902 is configured to send a second indication message to a third CN element, the second indication message being used to instruct to perform modification of session management context.

The second sending unit 903 is configured to send a third HO request to a second CN element to trigger the second CN element to establish a target link in the second CN.

In an implementation mode, the operation that the second CN element establishes the target link in the second CN includes the following operations.

The second CN element establishes a link channel with a fourth CN element.

The second CN element establishes a link channel with a second RAN element.

In an implementation mode, the device further includes a second receiving unit 904 and a notification unit 905.

The second receiving unit 904 is configured to receive a target link establishment completion message sent by the second CN element.

The notification unit 905 is configured to notify a fifth CN element to perform user-plane path handover.

In an implementation mode, that the data of the UE is transmitted between the second RAN and the second CN includes the following conditions.

Uplink data of the UE, after being sent to the second RAN, is sent to the second CN by the second RAN.

Downlink data of the UE, after being sent to the second RAN by the second CN, is sent to the UE by the second RAN.

Those skilled in the art should know that functions realized by each unit in the handover device shown in FIG. 9 may be understood with reference to related descriptions about the handover method. The functions of each unit in the handover device shown in FIG. 9 may be realized through programs running in a processor, and may also be realized through a specific logical circuit.

When being implemented in form of software functional module and sold or used as an independent product, the handover device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, having stored therein computer-executable instructions, where the computer-executable instructions, when being executed by a processor, enable the processor to implement the handover method of the embodiments of the disclosure.

Figure 10:
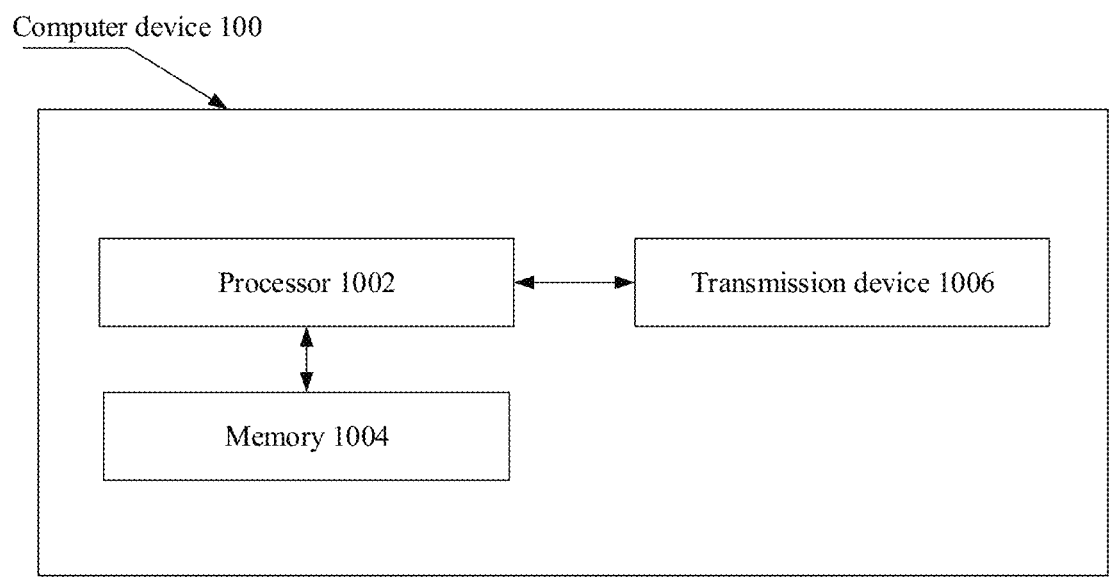
FIG. 10 is a schematic structural composition diagram of a computer device according to an embodiment of the disclosure.

FIG. 10 is a schematic structural diagram of a computer device according to an embodiment of the disclosure. The computer device may be UE and may also be a network device. As shown in FIG. 10, the computer device 100 may include one or more (only one is illustrated in the figure) processors 1002 (the processor 1002 may include, but not limited to, a processing device such as a Micro Control Unit (MCU) or a Field Programmable Gate Array (FPGA), a memory 1004 configured to store data and a transmission device 1006 configured for a communication function. Those of ordinary skill in the art should know that the structure shown in FIG. 10 is only schematic and not intended to limit the structure of the electronic device. For example, the computer device 100 may further include components more or fewer than the components shown in FIG. 10 or has a configuration different from that shown in FIG. 10.

The memory 1004 may be configured to store a software program of application software and a module, for example, a program instruction/module corresponding to a method in the embodiments of the disclosure. The processor 1002 runs the software program and module stored in the memory 1004, thereby executing various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A handover method, comprising:

sending, by a first Radio Access Network (RAN) element, a first handover request message to a second RAN element to trigger handover of User Equipment (UE) from a first RAN to a second RAN with a connection between the first RAN and a first core network kept unchanged, wherein data of the UE is forwarded by the second RAN for transmission between the first RAN and the first core network; and sending, by the first RAN element, a second handover request message to a first core network element to trigger handover of the UE from the first core network to a second core network, wherein the data of the UE is transmitted between the second RAN and the second core network.

2. The method of claim 1, wherein sending, by the first RAN element, the first handover request message to the second RAN element to trigger handover of the UE from the first RAN to the second RAN comprises:

sending, by the first RAN element, the first handover request message to the second RAN element;

receiving, by the first RAN element, a handover request Acknowledgement (ACK) message from the second RAN element;

sending, by the first RAN element, a handover command to the UE such that the UE sends a handover complete message to the second RAN element; and receiving, by the first RAN element, a handover ACK message from the second RAN element to complete handover of the UE from the first RAN to the second RAN.

3. The method of claim 2, wherein the first handover request message, the handover request ACK message and the handover ACK message are transmitted through a manner of:

the first handover request message, the handover request ACK message and the handover ACK message being transmitted through a direct interface between the first RAN element and the second RAN element; or the first handover request message, the handover request ACK message and the handover ACK message being forwarded by the first core network element and second core network element which are located between the first RAN element and the second RAN element.

4. The method of claim 2, wherein the handover request ACK message carries a resource allocated to the UE by the second RAN.

5. The method of claim 1, wherein the data of the UE being forwarded by the second RAN for transmission between the first RAN and the first core network comprises that:

uplink data of the UE, after being sent to the second RAN, is forwarded to the first RAN by the second RAN and transmitted between the first RAN and the first core network; and downlink data of the UE, after being sent to the first RAN by the first core network, is sent to the second RAN by the first RAN and forwarded to the UE by the second RAN.

6. The method of claim 1, wherein the second handover request message carries a first indication message, the first indication message being used to indicate that handover of the UE from the first RAN to the second RAN is completed.

7. The method of claim 1, wherein the data of the UE being transmitted between the second RAN and the second core network comprises that:

uplink data of the UE, after being sent to the second RAN, is sent to the second core network by the second RAN; and downlink data of the UE, after being sent to the second RAN by the second core network, is sent to the UE by the second RAN.

8. A handover device, comprising: a processor; and a transceiver, wherein the processor is configured to control the transceiver to:

send a first handover request message to a second Radio Access Network (RAN) element to trigger User Equipment (UE) to be handed over from a first RAN to a second RAN with a connection between the first RAN and a first core network kept unchanged, data of the UE being forwarded by the second RAN for transmission between the first RAN and the first core network; and send a second handover request to a first core network element to trigger handover from the first core network to a second core network, the data of the UE being transmitted between the second RAN and the second core network.

9. The device of claim 8, wherein the processor is configured to further control the transceiver to:

receive a handover request ACK message sent by the second RAN element;

send a handover command to the UE such that the UE sends handover complete message to the second RAN element; and receive a handover ACK message from the second RAN element to complete handover of the UE from the first RAN to the second RAN.

10. The device of claim 9, wherein the first handover request message, the handover request ACK message and handover ACK message are transmitted through a manner of the following:

the messages are transmitted through a direct interface between a first RAN element and the second RAN element; or, the messages are forwarded by the first core network element and second core network element between the first RAN element and the second RAN element.

11. The device of claim 9, wherein the handover request ACK message carries a resource allocated to the UE by the second RAN.

12. The device of claim 8, wherein the data of the UE being forwarded by the second RAN for transmission between the first RAN and the first core network comprises that:

uplink data of the UE, after being sent to the second RAN, is forwarded to the first RAN by the second RAN and transmitted between the first RAN and the first core network; and downlink data of the UE, after being sent to the first RAN by the first core network, is sent to the second RAN by the first RAN and forward to the UE by the second RAN.

13. A handover device, comprising: a processor; and a transceiver, wherein the processor is configured to control the transceiver to:

after User Equipment (UE) is handed over from a first Radio Access Network (RAN) to a second RAN with a connection between the first RAN and a first core network kept unchanged, receive a second handover request message from a first RAN element, wherein the second handover request is used to trigger handover of the UE from the first core network to a second core network, and data of the UE is transmitted between the second RAN and the second core network after handover from the first core network to the second core network.

14. The device of claim 13, wherein the second handover request carries a first indication message, the first indication message being used to indicate that handover of the UE from the first RAN to the second RAN is completed.

15. The device of claim 13, wherein the processor is configured to further control the transceiver to:
   send a second indication message to a third core network element, the second indication message being used to instruct to perform modification of session management context; and
   send a third handover request to a second core network element to trigger the second core network element to establish a target link in the second core network.

16. The device of claim 15, wherein the second core network element establishes the target link in the second core network comprises that:
   the second core network element establishes a link channel with a fourth core network element; and
   the second core network element establishes a link channel with a second RAN element.

17. The device of claim 15, wherein the processor is configured to further control the transceiver to:
   receive a target link establishment completion message sent by the second core network element; and
   notify a fifth core network element to perform user-plane path handover.

18. The device of claim 13, wherein the data of the UE being transmitted between the second RAN and the second core network comprises that:
   uplink data of the UE, after being sent to the second RAN, is sent to the second core network by the second RAN; and
   downlink data of the UE, after being sent to the second RAN by the second core network, is sent to the UE by the second RAN.

* * * * *